United States Patent
Djan-Sampson et al.

(10) Patent No.: US 11,063,441 B2
(45) Date of Patent: Jul. 13, 2021

(54) SYSTEMS AND METHODS FOR MANAGING RESONANCE IN WIND TURBINE POWER SYSTEMS

(71) Applicant: General Electric Company, Schenectady, NY (US)

(72) Inventors: Patrick Djan-Sampson, Schenectady, NY (US); Einar Vaughn Larsen, Ballston Lake, NY (US); Alfredo Sebastian Achilles, Niskayuna, NY (US); Enno Ubben, Steinfurt (DE)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 16/163,902

(22) Filed: Oct. 18, 2018

(65) Prior Publication Data
US 2020/0127461 A1    Apr. 23, 2020

(51) Int. Cl.
*H02J 3/38* (2006.01)
*F03D 7/02* (2006.01)
(Continued)

(52) U.S. Cl.
CPC .............. *H02J 3/386* (2013.01); *F03D 7/028* (2013.01); *F03D 7/0272* (2013.01); *F03D 7/048* (2013.01);
(Continued)

(58) Field of Classification Search
CPC ........ H02J 3/386; F03D 7/0272; F03D 7/028; F03D 7/048; F03D 7/0284; H02P 2101/15
(Continued)

(56) References Cited

U.S. PATENT DOCUMENTS

2010/0109447 A1    5/2010   Achilles et al.
2013/0119660 A1 *  5/2013   Yasugi ....................... H02P 9/04
                                                              290/44
(Continued)

FOREIGN PATENT DOCUMENTS

EP    2711543 A1 *  3/2014    ............... F03D 7/04
EP    2793343 A1    10/2014

OTHER PUBLICATIONS

European Search Report, dated Jan. 30, 2020 for EP Application No. 19203888.

*Primary Examiner* — Rocio Del Mar Perez-Velez
*Assistant Examiner* — Alicia M. Choi
(74) *Attorney, Agent, or Firm* — Dority & Manning, P.A.

(57) ABSTRACT

Systems and methods for managing or controlling resonance in wind turbine power systems are provided. In particular, a method for controlling a power system that includes a central master controller and one or more wind turbines electrically connected to a power grid through a point of interconnection can be provided, where each wind turbine includes a voltage regulator. The method can include receiving, by the controller, a signal from a sensor associated with wind turbines and determining, which wind turbines are operating in conditions indicative of a resonance condition in the wind turbine electrical power system based, at least in part, on the sensor signals. The method can also include generating one or more control signals based, at least in part, on a power requirement at the point of intersection and controlling an operational state of each of the voltage regulators based on the control signals.

14 Claims, 5 Drawing Sheets

(51) Int. Cl.
*F03D 7/04* (2006.01)
*H02P 101/15* (2016.01)

(52) U.S. Cl.
CPC .. *G05B 2219/2619* (2013.01); *H02P 2101/15* (2015.01)

(58) Field of Classification Search
USPC .......................................................... 700/287
See application file for complete search history.

(56) References Cited

U.S. PATENT DOCUMENTS

| | | | |
|---|---|---|---|
| 2013/0278308 A1* | 10/2013 | Larsen | H02P 21/05 327/156 |
| 2014/0159367 A1* | 6/2014 | Yin | F03D 7/0284 290/44 |
| 2014/0300108 A1 | 10/2014 | Sahukari et al. | |
| 2015/0148974 A1* | 5/2015 | Diedrichs | H02J 3/16 700/287 |
| 2015/0184632 A1* | 7/2015 | Sagi | H02J 3/381 290/44 |
| 2016/0065105 A1 | 3/2016 | Hardwicke, Jr. et al. | |
| 2016/0336888 A1* | 11/2016 | Busker | H02J 3/24 |
| 2017/0067445 A1 | 3/2017 | Carulla | |
| 2017/0346283 A1* | 11/2017 | Inam | H02J 1/14 |
| 2018/0138708 A1 | 5/2018 | De Rijcke et al. | |

* cited by examiner

SYSTEMS AND METHODS FOR MANAGING RESONANCE IN WIND TURBINE POWER SYSTEMS

FIELD

The present disclosure relates generally to systems and methods for controlling wind turbines, and more particularly, systems and methods for managing or controlling resonance in wind turbine power systems.

BACKGROUND

Wind power is considered one of the cleanest, most environmentally friendly energy sources presently available, and wind turbines have gained increased attention in this regard. Existing electrical power distribution systems (e.g., power grids) can be utilized for distributing power from renewable energy sources, such as wind, if control systems and methodologies are utilized to coordinate power produced by the renewable energy sources, the power demand on the power distribution systems and the power consumed based on the varying operational states that are inherent with respect to renewable energy sources. For example, the operational state of a wind turbine can vary based on wind speeds or the absence of wind.

Wind power does not always have a constant power output, but can include variations; therefore, operators of power distribution systems have to take this into account. One of the consequences is, for example, that the distribution and transmission networks have become more difficult to manage. This pertains also to the management of resonance in a power distribution system, including wind turbines. Like conventional power plants, wind power plants or wind farms should be managed or controlled to provide power grids with power that is stable (e.g., with constant voltage and frequency, minimum disturbances, and low harmonics emission) to ensure reliability and proper delivery of power.

Wind turbine power systems, which may include wind turbines and wind farms, have a plurality of mechanical and electrical components. Each of the electrical and/or mechanical components may have independent or different operating limitations, such as current, voltage, power, and/or temperature limits. In some instances, when wind turbine power systems, wind turbines and/or wind farms are integrated into or connected with power distribution systems (e.g., main and/or existing power grids), resonance can cause distortion which can negatively impact power quality. Resonance can be caused by interactions among and between certain components of the electrical infrastructure of the wind turbine power systems, such as interconnected power converters associated with each of a plurality of wind turbines, the grid, or the wind farm.

Within a wind turbine power system or wind farm, several components of the electrical infrastructure can resonate with each other (e.g., transformers, power cables, capacitors, etc.). When a frequency (voltage or current) experiences an inductive element reactance equal or nearly equal to a capacitive element reactance, resonance can occur. Additionally, with respect to renewable energy plants, such as wind farms, connection of these renewable energy plants to the grid can include long high voltage transmission lines due to the remote locations in which these plants can be located. Transmission lines (i.e., power cables) and additional electrical infrastructure (e.g., transformers, reactors, capacitors) can result in resonance at low frequencies (e.g., below second or third harmonics). Resonance at low frequencies occurs because of the capacitance associated with high voltage transmission lines. The capacitance of transmission lines increases as the length of transmission lines increases. Resonance occurring at low frequencies can interact with wind farm power converters, or components thereof, such as converter control regulators (i.e., wind turbine terminal voltage regulator), and result in instability with respect to the power provided by the wind farm.

Resonance can cause instability with respect to the power provided by a wind farm, because resonance can cause voltages to be significantly higher than normal operating levels for the wind farm and/or power grid, when current for the wind farm and/or grid is below normal operating levels. Maintenance of voltage within electrical power distribution systems is important to the stability of the system with respect to power delivery and power flow. Failing to maintain voltage within electrical power distribution systems can have negative consequences and effects on the systems, including voltage collapse which can cause damage to generation, transmission and distribution equipment and result in blackouts. The stability of electrical power distribution systems (e.g., electrical grids) is related to resonance; therefore, it is usually necessary to manage resonance related to a renewable source to fulfill electrical demand while providing stability for the electrical grid.

The operation of inverter-based resources, such as wind turbines, requires grid strength which enables the grid to operate in a reliable and stable manner. However, in many instances due to the remote or harsh conditions where many wind farms are located, wind farms are often integrated with weak grids that can be negatively impacted by resonance. Integrating inverter-based resources into weak grids can present many challenges, such as creating the potential for a resonance condition in the system, that can be mitigated by different methods including reinforcements of the transmission lines or integrating additional equipment into the grid to improve strength. These methods of grid reinforcement include disadvantages, including additional space requirements, multiple control locations and settings, increased system component costs, increased system installation costs and increased system maintenance costs.

BRIEF DESCRIPTION

Aspects and advantages of the invention will be set forth in part in the following description, or may be obvious from the description, or may be learned through practice of example embodiments of the present disclosure.

One example aspect of the present disclosure is directed to a method for controlling a wind farm electrical power system. The wind farm electrical power system can include a controller and one or more wind turbines electrically connected to a power grid through a point of interconnection. Each wind turbine can also include a voltage regulator. The method includes receiving, by the controller, one or more signals from a sensor associated with the one or more wind turbines and determining, by the controller, one or more wind turbines that are operating in conditions indicative of a resonance condition in the wind turbine electrical power system based, at least in part, on the one or more of the sensor signals. The method also included generating, by the controller, one or more control signals based, at least in part, on a power requirement at the point of intersection and controlling, by the controller, an operational state of each of the voltage regulators to reduce the resonance condition based, at least in part, on the one or more control signals.

Another example aspect of the present disclosure is directed to a control system for operating a wind farm electrical power system. The wind farm electrical power system can includes one or more wind turbines electrically connected to a power grid through a point of interconnection. The control system comprising can include one or more processors and one or more memory devices. The memory devices can be configured to store instructions that when executed by the one or more processors cause the cause the one or more processors to perform operations. The operations can include receiving, by the processors, one or more signals from a sensor associated with the one or more wind turbines and determining, by the processors, one or more wind turbines that are operating in conditions indicative of a resonance condition in the wind turbine electrical power system based, at least in part, on the one or more of the sensor signals. The operations can also include generating, by the processors, one or more control signals based, at least in part, on a power requirement at the point of intersection and controlling an operational state of each of the voltage regulators to reduce the resonance condition based, at least in part, on the one or more control signals.

Another example aspect of the present disclosure is directed to a wind farm. The wind farm can include one or more wind turbines electrically connected to a power grid through a point of interconnection. The wind farm can include a controller configured to perform one or more operations. The operations can include receiving, by the processors, one or more signals from a sensor associated with the one or more wind turbines and determining, by the processors, one or more wind turbines that are operating in conditions indicative of a resonance condition in the wind turbine electrical power system based, at least in part, on the one or more of the sensor signals. The operations can also include generating, by the processors, one or more control signals based, at least in part, on a power requirement at the point of intersection and controlling an operational state of each of the voltage regulators to reduce the resonance condition based, at least in part, on the one or more control signals.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Connection of wind turbine electrical power systems (e.g., power systems which can include one or more wind turbines and one or more wind farms), to power grids can include long high voltage transmissions lines. These transmission lines and other electrical infrastructure (e.g., transformers, reactors, capacitors) associated with the wind turbine power system can result in resonance at low frequencies (i.e., below second or third harmonics). The resonances can interact with converter control regulators (i.e., a wind turbine terminal voltage regulator) that are part of the wind turbine power system and result in instabilities in the power provided by the wind turbine electrical power system. Therefore, example aspects of the present disclosure are directed to systems and methods for controlling wind turbine electrical power systems, and more particularly, to systems and methods for controlling or managing resonance in wind turbine electrical power systems.

According to example aspects of the present disclosure, wind turbine electrical power systems, including wind turbines and wind farms, can be dynamically managed or controlled such that these renewable energy sources (e.g., wind turbines) are operated more efficiently with respect to resonance, without the need for additional electrical infrastructure or grid reinforcement. For instance, example aspects of the present disclosure can include a controller, such as a central master controller, which is utilized to gather and process wind turbine or wind farm level operational information indicative of one or more operating conditions of the wind turbine or wind farm (e.g., the voltage level or power output of the wind turbine or wind farm). Said turbine level or farm level information can be utilized by the controller to dynamically control one or more operational aspects of the wind turbine electrical power system. For example, the turbine level or farm level information can be utilized by the controller to generate one or more control signals to configure, adjust or tune the voltage regulator gains for one or more voltage regulators that can be associated with the one or more wind turbines or wind farms, such as voltage regulators associated with power converters for the one or more wind turbines.

According to example aspects of the present disclosure, the systems and methods can include a central master controller and/or a central control unit associated with each of one or more wind farms, to provide stable power (e.g., stable voltage and current) to the point of interconnection (POI) between the one or more wind farms and the power grid when low frequency resonances exist in the wind turbine electrical power systems. The wind turbine electrical power systems can include one or more wind farms. The one or more wind farms can include one or more wind turbines. Each wind turbine can include a power converter, which may include one or more voltage regulators.

When low frequency resonances exist in wind turbines electrical power systems, resonance can be dynamically and efficiently managed through example embodiments of the present disclosure by selectively adjusting or configuring the gain of the one or more voltage regulators, simultaneously or independently, based upon the level of voltage required at the POI to provide stable or consistent voltage to the power grid and/or based on the number of wind turbines that are operational and one or more characteristics of the operational wind turbines (e.g., wind turbine size, location, age, maintenance status), characteristics of the power grid (e.g., strength or condition of the grid, strength or condition of the connection of the wind farm or wind turbine to the grid, grid architecture, grid location), characteristics of the load on the grid (e.g., loads that are heavy or variable) and/or the environmental conditions (e.g., the wind conditions for the one or more wind turbines).

An example method for management or control of resonance according to example aspects of the present disclosure can include receiving, via a central master controller, one or more signals from a plurality of turbine-level controllers indicative of the number of active wind turbines within one or more wind farms. The method also can include, determining, via the central master controller, the total power producing capability of the number of active wind turbines within the one or more wind farms (i.e., the maximum aggregate amount of power that can be produced by the one or more active turbines). The method also can include, determining, via the central master controller, the amount of power that is being produced from the number of active wind turbines within the one or more wind farms.

The method can further include comparing the amount of power being produced by the one or more active turbines to a predetermined power threshold. Resonance is often experienced during low power situations (e.g., environmental conditions, wind speeds, during which the wind turbines are producing a level of power that is below a predetermined power threshold). The predetermined power threshold can also be based, at least in part, on the total power production capabilities of the one or more wind turbines in the wind farm. The predetermined power threshold can correspond to conditions during which one or more wind turbines are not generating enough power to compensate for the power that is consumed by the wind turbines while they are kept online (i.e., the wind turbines are producing less real power than is being consumed). In each instance, the predetermined power threshold is indicative of conditions at the one or more wind turbines that can result in a resonance condition in the wind turbine electrical power system. A condition of resonance occurs when the wind turbine electrical power system or portions thereof are in a state of resonance. During a resonance condition, a collapsing magnetic field of the inductive elements of the electrical system (i.e., the wind turbine electrical power system and the grid) charge the capacitive elements of the electrical system, and then the capacitive elements discharge to provide an electric current that builds a magnetic field in the inductive elements of the electrical system. This process can repeat continually until it is controlled or managed. A resonance condition can be detrimental to the operation of electrical systems because it can cause unwanted sustained and transient oscillations that may cause noise, signal distortion, and damage to circuit elements. Thus, the example method can be utilized to reduce the resonance condition or otherwise reduce the amount of resonance present in the electrical system.

The method can further include generating, via the central master controller, one or more control signals for controlling the one or more wind turbines based, at least in part on the comparison of the amount of power being produced by the one or more active turbines to a predetermined power threshold. The control signal can correspond to and control the voltage regulator gain for the voltage regulator associated with each of the one or more wind turbines. The voltage regulator command can correspond to a scaler or gain level command between zero and one. By adjusting the voltage regulator gains, the resonance condition can be reduced or the amount of resonance present in the electrical system can be reduced.

More particularly, the generation of the one or more control signals according to example embodiments of the present disclosure can include the following: when the amount of power being produced by the one or more active turbines exceeds or is equal to the predetermined power threshold, the method includes generating, via the central master controller, a voltage regulator gain command for each the voltage regulators of wind turbines, such that the gain of each voltage regulator remains constant (i.e., a voltage regulator command of one). This voltage regulator command can be sent from the central master controller to each turbine-level controller or can be sent directly from the central master controller to each of the voltage regulators. In response to the voltage regulator gain command, the power converter and voltage regulator associated with each wind turbine continues to operate in its current conditions and based on its current parameters.

The generation of the one or more control signals according to example embodiments of the present disclosure can also include the following: when the amount of power being produced by the one or more active turbines is less than the predetermined power threshold, the method includes generating, via the central master controller, a voltage regulator gain command for each the voltage regulators of wind turbines, such that the gain of each voltage regulator is dynamically tuned based, at least in part, on the power needs at the POI (i.e., a voltage regulator command that is less than one). This voltage regulator command can be sent from the central master controller to each turbine-level controller or can be sent directly from the central master controller to each of the voltage regulators. In response to the voltage regulator gain command, one or more controllers will reduce the terminal voltage gains of each voltage regulator associated with each operational wind turbine is modified such that the wind farm provides power at the POI which includes voltage and current levels that are within a hysteresis window. The hysteresis window associated with the POI represents the power fluctuations associated with the power system which do not adversely affect the stability of the power grid. In some circumstances the hysteresis window is based on the tolerances of the electrical equipment at the POI. In some instances the hysteresis window is within 10% of the amount of power required at the POI.

In these ways, a central master controller can be utilized to dynamically tune parameters of multiple wind turbines and/or wind farms operating in a particular area and/or which are connected to the grid at a particular POI. In this way, example systems and methods according to the present disclosure can be utilized to tune multiple power converters such that the power converters, and the wind turbines associated therewith, operate in a desired operational mode based on common conditions at a POI (e.g., in an operational state wherein the resonance condition is reduced or the amount of resonance present in the electrical system is otherwise reduced).

In this way, example aspects of the present disclosure can provide a number of technical effects and benefits, including simultaneously tuning or controlling the parameters of the one or more power converters (and associated voltage regulators) operating within a certain geographic area to dynamically adapt the operation of said converters to the varying needs of the power grid at the POI, the power conditions (i.e., the voltage or current levels) at the POI, the overall power available from the one or more wind turbines and/or one or more wind farms and to adapt the operation of said converters based on varying grid conditions.

Dynamic and simultaneous, or near simultaneous, management of one or more power converters to control or manage resonance contained in a wind turbine electrical system by selectively adjusting the gains of the voltage regulators of the one or more power converters can also allow for the reduction or elimination of grid reinforcements (e.g., including reinforcements of the transmission lines or integrating additional equipment into the grid to improve strength) that as specifically designed or needed to correct weak grid conditions such that the wind turbine electrical system provides stable power (including stable voltage levels) which is required by the grid at the POI. Such systems and methods also provide the advantages of permitting the use of existing wind turbines to provide stable power to the grid without the need for the addition of further system components (e.g., including reinforcements of the transmission lines or integrating additional equipment into the grid to improve strength) to address weak grid conditions. Other technical effects and benefits of such advantages of the example systems of methods of the present disclosure include enhanced grid security for grid events, tight voltage regulation under varying conditions and security from system voltage disturbances. In this way, example aspects of the present disclosure can provide a number of technical effects and benefits.

Referring now to the figures, example aspects of the present disclosure will be discussed in greater detail.

Figure 1:
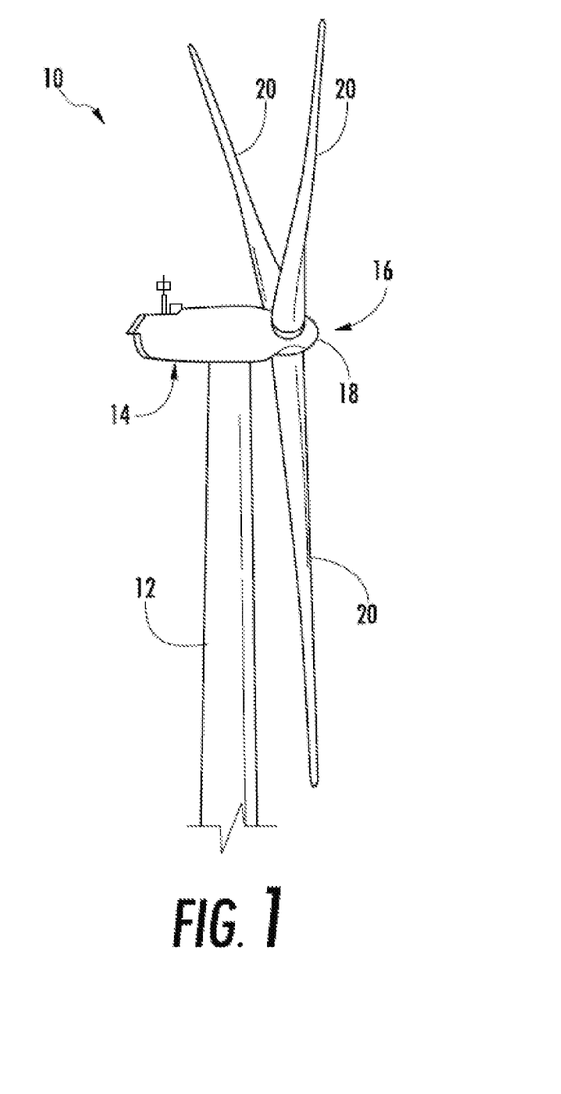
FIG. 1 depicts a perspective view of a portion of a wind turbine according to example embodiments of the present disclosure.

FIG. 1 depicts a wind turbine 10 according to example embodiments of the present disclosure. As shown, the wind turbine 10 includes a nacelle 14 that typically houses a generator 28 (shown in FIG. 2). The nacelle 14 is mounted on a tower 12 extending from a support surface. The wind turbine 10 also includes a rotor 16 that includes a plurality of rotor blades 20 attached to a rotating hub 18.

Figure 2:
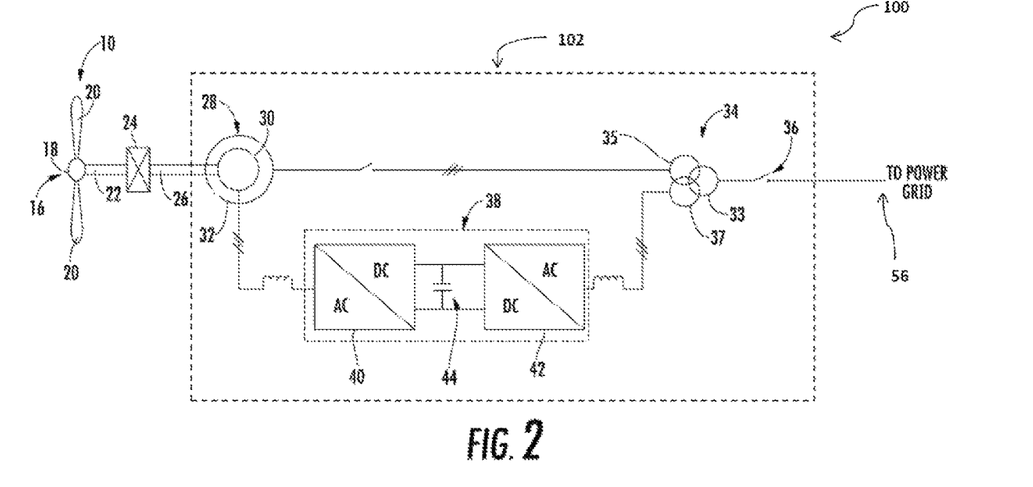
FIG. 2 depicts a schematic diagram of a wind turbine electrical power system according to example embodiments of the present disclosure which is suitable for use with the wind turbine shown in FIG. 1.

FIG. 2 depicts a wind turbine power system 100, which includes a wind turbine 10 and associated power system 102 suitable for use with the wind turbine 10. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is connected to a power grid at a POI 56 via a grid breaker 36. Thus, the main transformer 34 steps up the voltage amplitude of the electrical power such that the transformed electrical power may be further transmitted to the power grid.

In addition, as shown, the generator 28 is electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

Figure 3:
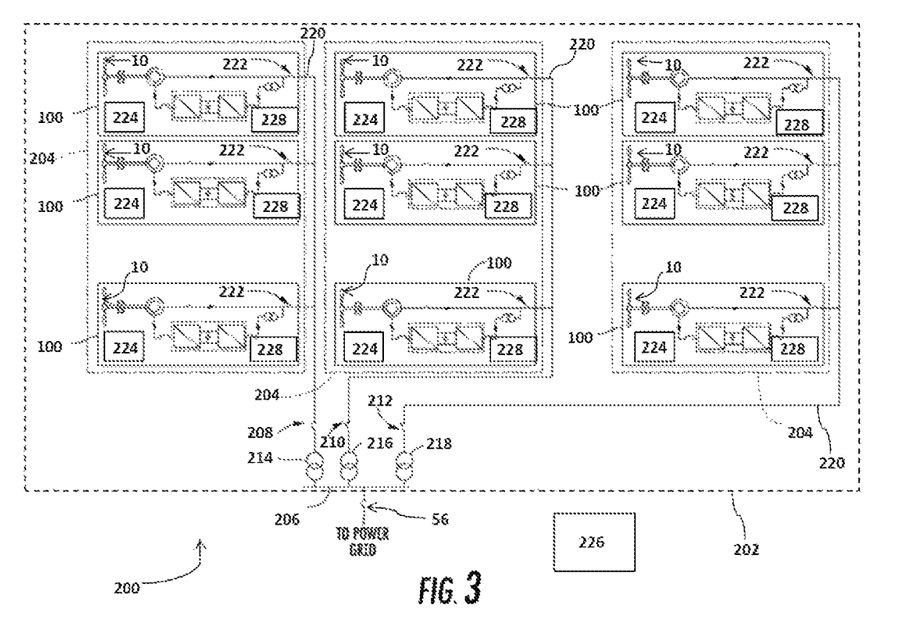
FIG. 3 depicts a schematic diagram of a wind farm electrical power system according to example embodiments of the present disclosure.

In some configurations power system 102 can include a turbine level controller 224 (shown in FIG. 3). Turbine level controller 224 can be a control, such as the controller shown and described in FIG. 4.

The illustrated three-winding transformer 34 can have (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

FIG. 3 depicts a schematic diagram of one embodiment of a wind farm electrical power system 200 according to example embodiments of the present disclosure. Wind farm electrical power system 200 can include a plurality of wind turbine power systems 100, connected to a power grid via a POI 56. The wind farm electrical power system 200 may include at least two clusters 204 to form an electrical power system 200. Individual wind turbine power systems 100 including of a plurality of wind turbines 10 may be arranged in predetermined geographic locations and electrically connected together to form a wind farm 202.

The electrical power associated with each wind turbine power system 100 can be transmitted to a main line 206 via one or more cluster lines 220. Each wind turbine power system 100 can be connected or disconnected to the one or more cluster lines 220 via one or more switches or breakers 222. Wind turbine power systems 100 may be arranged into a plurality of groups (or clusters) 204 with each group separately connected to a main line 206 via switches 208, 210, 212, respectively. Thus, as shown, each cluster 204 may be connected to a separate transformer 214, 216, 218 via switches 208, 210, 212, respectively, for stepping up the voltage amplitude of the electrical power from each cluster 204 such that the transformed electrical power may be further transmitted to the power grid. In addition, as shown, the transformers 214, 216, 218 are connected to a main line 206 that combines the voltage from each cluster 204 before sending the power to the grid via a POI 56. The POI 56 can be a breaker, switch or other known method of connection to a power grid.

Each wind turbine power system 100 can include a voltage regulator 228 (i.e., a wind turbine terminal voltage regulator). Voltage regulator 228 regulates the voltage which is output by each wind turbine power system 100. Voltage regulator 228 can be in electrical communication with turbine controller 224 or central master controller 226. Thus, the turbine-level controller 224 or central master controller 226 can deliver a voltage regulator gain command ($V_{CMD}$) to one or more of the voltage regulators 228 which in turn dictates the amount of power distributed to the POI 56 via cluster lines 220.

Each wind turbine power system 100 can include one or more controllers, such as turbine controller 224. Turbine controller 224 can be configured to control the components of the wind turbine power system 100, including switches 222 or voltage regulator 228, and/or implement some or all of the method steps as described herein. Turbine controller 224 can be located on or within each wind turbine 10 or can be located remotely from each wind turbine 10. Turbine controller 224 can be part of or included with one or more of the other controllers associated with wind turbine power system 100 and/or the wind farm electrical power system 200. Turbine controller 224 can operate switches 222 to connect or disconnect the one or more wind turbine power systems 100 from the cluster lines 220 and control the voltage regulator 228, such as the voltage regulator gain, based at least in part on the power required at the POI 56, and/or based, at least in part, on characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

The wind farm electrical power system 200 can include one or more controllers, such as central master controller 226. Central master controller 226 can be configured to control the components of the wind farm electrical power system 200, including switches 208, 210 and 212, voltage regulators 228, communicate with one or more other controllers, such as turbine-level controllers 224, and/or implement some or all of the method steps as described herein. Central master controller 226 can be located within the geographic area of the wind farm electrical power system 200, or any portion thereof, or can be located remotely from the wind farm electrical power system 200, or any portion thereof. Central master controller 226 can be part of or included with one or more of the other controllers associated with one or more of the wind turbine power systems 100 and/or the wind farm electrical power system 200. Each of the clusters 204, wind turbine power systems 100, or turbine-level controllers 224, may be communicatively coupled with a Central master controller 226.

Central master controller 226 can generate and send control signals to turbine controller 224 to operate switches 222 to connect or disconnect the one or more wind turbine power systems 100 from the cluster lines 220 based at least in part on the power required at the POI 56. Central master controller 226 can generate and send control signals to voltage regulators 228 to operate or control the voltage regulators 228 and control the amount of power delivered to the POI from the one or more wind turbine power systems 100 through the cluster lines 220 based at least in part on the power required at the POI 56. Central master controller 226 can generate and send control signals to switches 208, 210 and/or 212 and/or voltage regulators 228 to regulate the power delivered to the POI 56, based at least in part on the power required at the POI 56, and/or based, at least in part, on characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Figure 4:
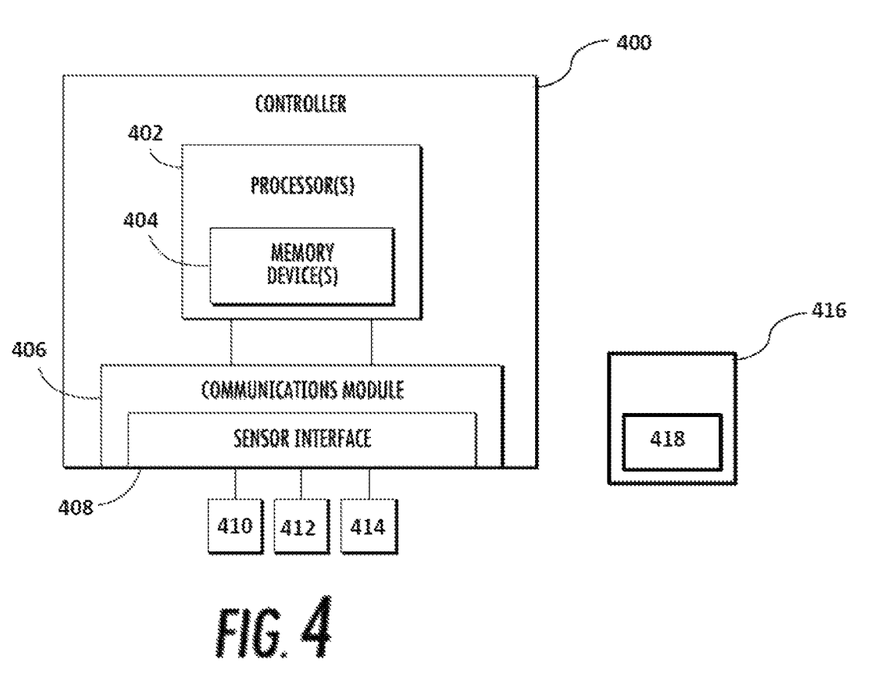
FIG. 4 depicts a block diagram of a controller according to example embodiments of the present disclosure.

FIG. 4 depicts a block diagram of a controller 400 according to example embodiments of the present disclosure. Controller 400 can be a turbine-level controller 224 or central master controller 226. Controller 400 can include one or more processor(s) 402 and associated memory device(s) 404 configured to perform a variety of computer-implemented functions (e.g., performing the methods, steps, calculations and the like and storing relevant data as disclosed herein). Memory device 404 may also store date relevant to certain characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Additionally, controller 400 may include a communications module 406 to facilitate communications between the controller and the various components of the wind turbine power system 100, the wind farm electrical power system 200 and/or the central master controller 226, including communication between central master controller 226 and turbine-level controller 224. Further, the communications module 406 may include a sensor interface 408 (e.g., one or more analog-to-digital converters) to permit signals transmitted from one or more sensors 410, 412 and 414 to be converted into signals that can be understood and processed by the processors 402. Sensors 410, 412 and 414 can be used to measure, ascertain or gather data regarding characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Controller 400 can also include a user interface 416. User interface 416 can have various configurations and controls can be mounted or in user interface 416. User interface 416 can also be located within the geographic area of the wind farm electrical power system 200, or any portion thereof, or can be located remotely from the wind farm electrical power system 200, or any portion thereof. The user interface 416 can include an input component 418. Input component 418 can be, for instance, a capacitive touch screen. The input component 418 can allow for the selective activation, adjustment or control of wind farm controller 226 and turbine controller 224, as well as any timer features or other user adjustable inputs. One or more of a variety of electrical, mechanical or electro-mechanical input devices, including rotary dials, push buttons, and touch pads, can also be used singularly or in combination as input component 418. The user interface 416 can include a display component, such as a digital or analog display device designed to provide operation feedback to a user.

It should be appreciated that the sensors 410, 412 and 414 may be communicatively coupled to the communications module 406 using any suitable means. For example, the sensors 410, 412 and 414 may be coupled to the sensor interface 408 via a wired connection. However, in other embodiments, the sensors 410, 412 and 414 may be coupled to the sensor interface 408 via a wireless connection, such as by using any suitable wireless communications protocol known in the art. As such, the processor 402 may be configured to receive one or more signals from the sensors 410, 412 and 414. Sensors 410, 412 and 414 can be part of or included with one or more of the other controllers associated with one or more of the wind turbine power systems 100 and/or the wind farm electrical power system 200. Sensors 410, 412 and 414 can also be located within the geographic area of the wind farm electrical power system 200, or any portion thereof, or can be located remotely from the wind farm electrical power system 200, or any portion thereof.

It should also be understood that sensors 410, 412 and 414 can be any number or type of voltage and/or electric current sensors may be employed within the wind turbine power systems 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the one or more controllers, such as wind farm controller 226 and turbine controller 224, are configured to receive one or more voltage and/or electric current feedback signals from sensors 410, 412 and 414.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 402 is also configured to compute advanced control algorithms and communicate to a variety of Ethernet or serial-based protocols (Modbus, OPC, CAN, etc.). Additionally, the memory device(s) 404 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

Figure 5:
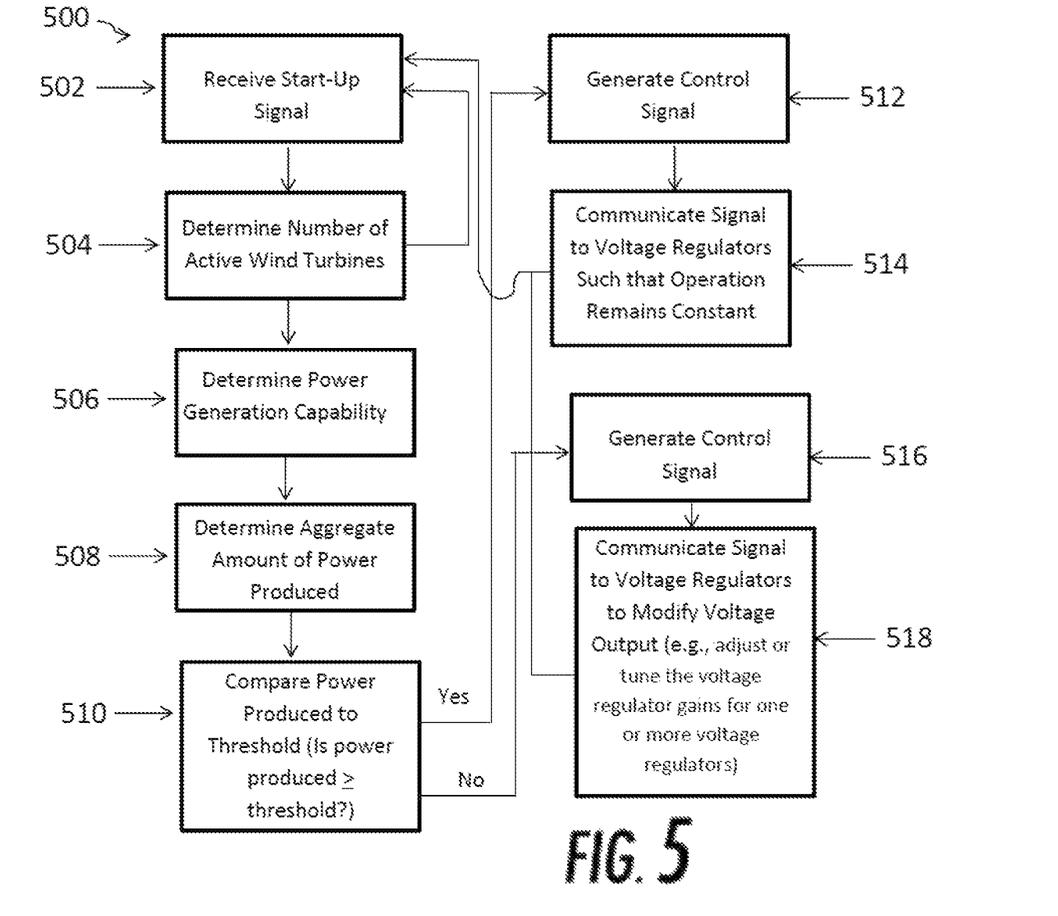
FIG. 5 depicts a flow diagram of an example method for managing or controlling resonance in wind turbine systems.

FIG. 5 depicts a flow diagram of an example method for managing or controlling resonance in wind turbine systems. Method 500 can be performed by one or more controllers, such as central master controller 226 and/or turbine-level controller 224, and by the other devices included with a wind turbine power system 100 and/or wind farm electrical power system 200. FIG. 5 depicts steps of method 500 performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure.

Method 500 can be utilized to dynamically manage or control renewable energy sources (e.g., such as wind farm electrical power system 200 and/or wind turbine power system 100) such that they are operated more efficiently with respect to resonance, without the need for additional electrical infrastructure or grid reinforcement. Method 500 can also be used to provide stable power (e.g., stable voltage and current) to a point of interconnection (such as POI 56) between the one or more wind farm electrical power systems 200 and the power grid when low frequency resonances exist in the wind turbine electrical power systems 200. The wind turbine electrical power systems can include one or more wind farms 100. The one or more wind farms can include one or more wind turbines 10. Each wind turbine can include a power converter, which may include one or more voltage regulators 228.

When low frequency resonances exist in wind turbines electrical power systems 200, method 500 can be utilized to dynamically and efficiently manage resonance by selectively adjusting or configuring the gain of the one or more voltage regulators 228, simultaneously or independently, based upon the level of voltage required at the POI 56 to provide stable or consistent voltage to the power grid and/or based on the number of wind turbines 10 that are operational and one or more characteristics of the operational wind turbines 10 (e.g., wind turbine size, location, age, maintenance status), characteristics of the power grid (e.g., strength or condition of the grid, strength or condition of the connection of the wind farm or wind turbine to the grid, grid architecture, grid location), characteristics of the load on the grid (e.g., loads that are heavy or variable) and/or the environmental conditions (e.g., the wind conditions for the one or more wind turbines).

At (502) the method can include receiving a startup signal initiating the control algorithm for providing dynamic management of resonance. Startup signal can be generated and/or received by one or more controllers, such as central master controller 226 and/or turbine-level controller 224. Startup signal may be generated by one or more controllers, such as central master controller 226 and/or turbine-level controller 224, in response to a user input or interaction with the one or more controllers indicating a desire to initiate method 500. The user input can be provided through a user interface, such as user interface 416 (FIG. 4). Startup signal may be generated by one or more controllers, such as central master controller 226 and/or turbine controller 224, in response to one or more signals received from sensors 410, 412 and 414 indicative of status or amount of power at POI 56 or indicative of one or more environmental conditions (e.g., low wind or no wind conditions at one or more wind turbines 10). Low wind conditions exist when there is an inadequate amount of wind to permit a wind turbine 10 to produce or generate an amount of power that exceeds the amount of power consumed by the wind turbine 10 to remain operational. In other words, the wind speed available at the wind turbine 10 is such that the wind turbine 10 cannot generate enough real power to satisfy the real power demands or needs of the wind turbine 10.

No wind conditions exist when the wind speed at the wind turbine is below a wind speed threshold which represents the minimum amount of wind necessary to cause the rotor and rotor blades to turn. Low wind conditions exist when the wind speed is below a wind speed threshold at which there is an inadequate amount of wind to permit a wind turbine to produce or generate an amount of real power that exceeds the amount of real power consumed by the wind turbine to remain operational. In other words, the wind speed available at the wind turbine is such that the wind turbine cannot generate enough real power to satisfy the real power demands or needs of the wind turbine. Low wind condition can also represent a steady wind condition that will cause the rotor of the wind turbine to move beyond the cut-in speed of the turbine (this is typically a steady state wind speed of approximately 3 to 4 m/s).

At (504) the method can include receiving, via a central master controller 226, one or more signals from a plurality of turbine-level controllers 224 indicative of the number of active wind turbines 10 within one or more wind farms 202. Such determination can be made based at least in part on one or more signals received by the one or more controllers (such as wind farm controller 226 and/or turbine controller 224) from sensors 410, 412 and 414 indicative of the operational state of the one or more wind turbines 10 or indicative of one or more environmental conditions (e.g., low wind or no wind conditions at one or more wind turbines 10). If no wind turbines 10 are capable of providing power, method 500 returns to (502).

At (506) the method can include determining, via the central master controller 226, the total power producing capability of the number of active wind turbines 10 within the one or more wind farms 202 (i.e., the maximum aggregate amount of power that can be produced by the one or more active turbines).

At (508) the method can include determining, via the central master controller 226, the amount of power that is being produced from the number of active wind turbines 10 within the one or more wind farms 202.

At (510) the method can include comparing, via one or more controllers, the amount of power being produced by the one or more active turbines, which was determined at (508), to a predetermined power threshold. Resonance is often experienced during low power situations (e.g., environmental conditions, wind speeds, during which the wind turbines 10 are producing a level of power that is below a predetermined power threshold).

At (512) the method can include generating, via the central master controller, one or more control signals for controlling the one or more wind turbines based, at least in part on the comparison (510) of the amount of power being produced (504) by the one or more active turbines to a predetermined power threshold. The predetermined power threshold can be based, at least in part, on the total power production capabilities of the one or more wind turbines in the wind farm, determined at (506). The predetermined power threshold can also correspond to conditions during which one or more wind turbines 10 are not generating enough power to compensate for the power that is consumed by the wind turbines while they are kept online (i.e., the wind turbines are producing less real power than is being consumed). In this situation, the predetermined power threshold is indicative of conditions, such as low wind or no wind conditions, at the one or more wind turbines that can result in a resonance condition in the wind turbine electrical power system. The control signal can correspond to and control the voltage regulator gain for each voltage regulator 228 associated with each of the one or more wind turbines 10. The voltage regulator command generated at (512) can correspond to a scaler or gain level command between zero and one. By adjusting the voltage regulator gains with the voltage regulator command generated at (512), the resonance condition can be reduced or the amount of resonance present in the electrical system 200 can be reduced.

In some instances, power fluctuations associated with the wind turbine electrical power system 200 can occur rapidly or certain power fluctuations do not require correction or adjustment by controlling the voltage regulator gain for each voltage regulator 228 associated with each of the one or more wind turbines 10. Accordingly, the generation of a voltage regulator command, which can be generated at (512) and can correspond to a scaler or gain level command between zero and one, can be generated such that the gain level command gradually adjusts the voltage regulator gain for each voltage regulator 228 after the voltage regulator command is generated. In some instances, a slew rate limiter circuit can be utilized to manage the adjustment of the voltage regulator gain for each voltage regulator 228 during a predetermined period of time. The slew rate limiter can be used to manage the time or point at which the voltage regulator command is generated at (512). In other instances, a timer can be used to manage the adjustment of the voltage regulator gain for each voltage regulator 228 based, at least in part, on a predetermined period of time. The predetermined period of time can be a set time period, such as one minute. In other instances the predetermined period of time can be associated with the period of time during which fluctuations associated with the wind turbine electrical power system 200 occur within the hysteresis window associated with the POI 56. The timer can be utilized to manage the time or point at which the voltage regulator command is generated at (512) based on the predetermined period of time. The timer or slew rate limit can thus be used to simultaneously tune or controlling the parameters of the one or more voltage regulators 228 operating within a certain geographic area to dynamically adapt the operation of said converters to the varying needs of the power grid at the POI 56, the power conditions (i.e., the voltage or current levels) at the POI 56, the overall power available from the one or more wind turbines and/or one or more wind farms and to adapt the operation of said converters based on varying grid conditions.

At (512), when the amount of power being produced by the one or more active turbines exceeds or is equal to the predetermined power threshold, the method includes generating, via the central master controller, a voltage regulator gain command for each of the voltage regulators 228 of wind turbines 10, such that the gain of each voltage regulator 228 remains constant (i.e., a voltage regulator command of one). At (512), when the amount of power being produced by the one or more active turbines exceeds or is equal to the predetermined power threshold, the method proceeds to (514).

At (514), the method can include sending the voltage regulator command signal, generated at (512) from the central master controller 226 to each turbine-level controller 224 or command signal can be sent directly from the central master 226 controller to each of the voltage regulators 228. In response to the voltage regulator gain command, the power converter and voltage regulator associated with each wind turbine continues to operate in its current conditions and based on its current parameters. Thereafter, method 500 returns to (502).

At (516), when the amount of power being produced by the one or more active turbines is less than the predetermined power threshold at (510), the method includes generating, via the central master controller, a voltage regulator gain command for each the voltage regulators 228 of wind turbines 10, such that the gain of each voltage regulator 228 is dynamically tuned based, at least in part, on the power needs at the POI (i.e., a voltage regulator command that is between zero and one, but less than one). This voltage regulator command can be sent from the central master controller 226 to each turbine-level controller 224 or can be sent directly from the central master controller 226 to each of the voltage regulators 228. In response to the voltage regulator gain command, the one or more controllers (e.g., central master controller 226 or turbine-level controller 224) will reduce or modify the terminal voltage gains of each voltage regulator 228 associated with each operational wind turbine 10 is modified such that the wind farm 202 provides power at the POI 56 which includes voltage and current levels that are within a hysteresis window. The hysteresis window associated with the POI 56 represents the power fluctuations associated with the wind turbine electrical power system 200 which do not adversely affect the stability of the power grid. In some circumstances the hysteresis window is based on the tolerances of the electrical equipment at the POI 56. In some instances the hysteresis window is within 10% of the amount of power required at the POI 56 to maintain the stability of the power grid. After the terminal voltage gains of each voltage regulator 228 are reduced or modified based on the voltage regulator gain command, method 500 returns to (502).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm electrical power system, wherein the wind farm electrical power system includes one or more controllers, one or more wind turbines electrically connected to a power grid through a point of interconnection, and wherein each wind turbine includes a voltage regulator, the one or more controllers including at least one turbine controller and a central master controller, the central master controller being configured to control an operational state of each of the voltage regulators of the one or more wind turbines, the method comprising:
   receiving, by the one or more controllers, one or more signals from a sensor associated with the one or more wind turbines;
   determining, by the one or more controllers, the one or more wind turbines that are operating in conditions indicative of a resonance condition in the wind turbine electrical power system based, at least in part, on the one or more sensor signals;
   determining, by the one or more controllers, a total amount of power being produced by the one or more wind turbines that are active;
   generating, by the one or more controllers, one or more control signals based, at least in part, on a power requirement at the point of interconnection and a comparison between the total amount of power being produced by the one or more wind turbines and a power threshold that is based at least in part on the total power production capabilities of the one or more wind turbines that are active;
   controlling, by the central master controller, an operational state of each of the voltage regulators to reduce the resonance condition based, at least in part, on the one or more control signals, wherein the controlling the operational state of each of the voltage regulators comprises adjusting, via the central master controller, a voltage regulator gain for one or more of the voltage regulators when the total power being produced by active wind turbines of the one or more wind turbines is less than the power threshold that is based, at least in part, on the total power production capabilities of the one or more wind turbines that are active and the number of the one or more wind turbines operating in low wind or no wind conditions; and
   following the controlling the operational state of each of the voltage regulators to reduce the resonance condition, detecting, by the central master controller, that the total power being produced by the one or more wind turbines that are active is greater than or equal to the power threshold; and
   generating, via the central master controller, a voltage regulator gain command configured to establish a constant gain for each of the voltage regulators of the wind turbines having the total power production at least equal to the power threshold.

2. The method of claim 1, wherein the power threshold is based at least in part on the resonance condition in the wind turbine electrical power system.

3. The method of claim 2, wherein the power threshold is based, at least in part, on the number of the one or more wind turbines that are active and operating in low wind or no wind conditions.

4. The method of claim 1, wherein the adjusting, by the central master controller, of the voltage regulator gain for each of the voltage regulators is based, at least in part, on the power requirement at the point of interconnection.

5. The method of claim 4, wherein the adjusting, by the central master controller, of the voltage regulator gain for each of the voltage regulators is further based, at least in part, on a hysteresis window associated with the point of interconnection.

6. A control system for operating a wind farm electrical power system, wherein the wind farm electrical power system includes one or more wind turbines electrically connected to a power grid through a point of interconnection, the control system comprising:
   one or more controllers, the one or more controllers including at least one turbine controller and a central master controller, the central master controller being configured to control an operational state of a voltage regulator of each of the one or more wind turbines, the one or more controllers including:
      one or more processors; and
      one or more memory devices, wherein the one or more memory devices configured to store instructions that when executed by the one or more processors cause the cause the one or more processors to perform operations, the operations comprising:
         receiving, by the one or more processors, one or more signals from a sensor associated with the one or more wind turbines;
         determining, by the one or more processors, the one or more wind turbines that are operating in conditions indicative of a resonance condition in the wind turbine electrical power system based, at least in part, on the one or more sensor signals;
         determining, by the one or more processors, a total amount of power being produced by the one or more wind turbines that are active;
         generating, by the one or more processors, one or more control signals based, at least in part, on a power requirement at the point of interconnection and a comparison between the total amount of power being produced by the one or more wind turbines that are active and a power threshold that is based at least in part on the total power production capabilities of the one or more wind turbines that are active;

controlling, by the one or more processors of the central master controller, an operational state of each of the voltage regulators based, at least in part, on the one or more control signals, wherein the controlling the operational state of each of the voltage regulators comprises adjusting, via the one or more processors of the central master controller, a voltage regulator gain for one or more of the voltage regulators when the total power being produced by the one or more wind turbines that are active is less than the power threshold that is based at least in part on the total power production capabilities of the one or more wind turbines that are active and the number of the one or more wind turbines operating in low wind or no wind conditions;

following the controlling the operational state of each of the voltage regulators to reduce the resonance condition, detecting, by the central master controller, that the total power being produced by the one or more wind turbines that are active is greater than or equal to the power threshold; and generating, via the central master controller, a voltage regulator gain command configured to establish a constant gain for each of the voltage regulators of the wind turbines having the total power production at least equal to the power threshold.

7. The control system of claim 6, wherein operations further comprise: determining, by the one or more processors, a total amount of power being produced by the one or more wind turbines that are active;

generating, by the one or more processors, one or more control signals based at least in part on a comparison between the total power being produced by the one or more wind turbines that are active and a power threshold, the power threshold determined based at least in part on the resonance condition.

8. The control system of claim 7, wherein the power threshold is based at least in part on the number of the one or more wind turbines operating in low wind or no wind conditions.

9. The control system of claim 6, wherein the adjusting, by the central master controller, of the voltage regulator gain for each of the voltage regulators is based at least in part on the power requirement at the point of interconnection.

10. The control system of claim 9, wherein the adjusting, by the central master controller, of the voltage regulator gain for each of the voltage regulators is further based at least in part on a hysteresis window associated with the point of intersection.

11. A method for reducing resonance in an electrical power system, wherein the wind farm electrical power system includes one or more controllers, one or more wind turbines electrically connected to a power grid through a point of interconnection, and wherein each wind turbine includes a voltage regulator, the one or more controllers including at least one turbine controller and a central master controller, the central master controller being configured to control an operational state of each of the voltage regulators of the one or more wind turbines, the method comprising:

receiving, by the one or more controllers, one or more signals from a sensor associated with a number of wind turbines that are in an active state;

determining, by the one or more controllers, the one or more wind turbines that are in an active state and operating in conditions indicative of a resonance condition in the electrical power system based, at least in part, on the one or more sensor signals;

determining, by the one or more controllers, a total amount of power being produced by the one or more wind turbines that are in an active state;

generating, by the one or more controllers, one or more control signals based, at least in part, on a power requirement at the point of interconnection and a comparison between the total amount of power being produced by the one or more wind turbines that are active and a power threshold that is based at least in part on the total power production capabilities of the one or more wind turbines that are active, wherein the one or more control signals correspond to, at least, a gain level command between zero and one;

controlling, by the central master controller, an operational state of each of the voltage regulators to reduce the resonance condition based, at least in part, on the one or more control signals, wherein the controlling the operational state of each of the voltage regulators comprises adjusting, via the central master controller, a voltage regulator gain for one or more of the voltage regulators when the total power being produced by active wind turbines of the one or more wind turbines is less than the power threshold that is based, at least in part, on the total power production capabilities of the one or more wind turbines that are active and the number of the one or more wind turbines operating in low wind or no wind conditions; and following the controlling the operational state of each of the voltage regulators to reduce the resonance condition, detecting, by the central master controller, that the total power being produced by the one or more wind turbines that are active is greater than or equal to the power threshold; and generating, via the central master controller, a voltage regulator gain command configured to establish a constant gain for each of the voltage regulators of the wind turbines having the total power production at least equal to the power threshold.

12. The method of claim 11, wherein the power threshold is based, at least in part, on the number of the one or more wind turbines that are active and operating in low wind or no wind conditions.

13. The method of claim 11, wherein the gain level command is based, at least in part, on the power requirement at the point of interconnection.

14. The method of claim 13, wherein the adjusting, by the central master controller, of the voltage regulator gain for each of the voltage regulators is further based, at least in part, on a hysteresis window associated with the point of interconnection.

* * * * *